United States Patent [19]

Greefkes

[11] 4,097,693
[45] Jun. 27, 1978

[54] SWITCHING SYSTEM FOR AN AUTOMATIC TELECOMMUNICATION EXCHANGE WITH A PLURALITY OF INTERMEDIATE LINES THAT ARE GROUNDED WHEN NOT IN USE

[75] Inventor: Johannes Anton Greefkes, Knegsel, Netherlands

[73] Assignee: U.S. Philips Corporation, New York, N.Y.

[21] Appl. No.: 694,149

[22] Filed: Jun. 9, 1976

[30] Foreign Application Priority Data

Jun. 16, 1975 Netherlands .......................... 7507122

[51] Int. Cl.² .............................................. H04J 3/10
[52] U.S. Cl. ............................ 179/15 AT; 179/15 AN; 179/18 GF
[58] Field of Search ........ 179/15 AT, 18 GF, 15 AN

[56] References Cited

U.S. PATENT DOCUMENTS

| | | |
|---|---|---|
| 3,308,240 | 3/1967 | Von Sanden .................. 179/15 AT |
| 3,439,124 | 4/1969 | Dupieux et al. ................ 179/15 AT |
| 3,825,690 | 7/1974 | Kelly et al. .................... 179/15 AT |
| 3,864,525 | 2/1975 | Edstrom et al. ............. 179/15 AT X |
| 3,892,925 | 7/1975 | Fisk et al. ...................... 179/15 AT |
| 3,956,593 | 5/1976 | Collins et al. ................. 179/15 AQ |

Primary Examiner—Thomas W. Brown
Attorney, Agent, or Firm—Frank R. Trifari; Henry I. Steckler

[57] ABSTRACT

Switching system for an automatic telecommunication exchange with space- and time division multiplex. A two-stage switching network is described which, from the traffic-technical point of view is the equivalent of a single switching matrix. The switching network is divided into two stages in such a way that the crosstalk is reduced. The two stages are interconnected via time division multiplex intermediate lines. The intermediate lines which are not used for connection at any moment are grounded. Controlling the crosspoints does not require more routing memories as for a single switching matrix having the same number of inputs and outputs.

4 Claims, 5 Drawing Figures

SWITCHING SYSTEM FOR AN AUTOMATIC TELECOMMUNICATION EXCHANGE WITH A PLURALITY OF INTERMEDIATE LINES THAT ARE GROUNDED WHEN NOT IN USE

BACKGROUND OF THE INVENTION (1) Field of the Invention

Switching system for an automatic telecommunication exchange for connecting channels of incoming time division multiplex lines with channels of outgoing time division multiplex lines, comprising a switching network which is provided with crosspoint elements which are switched in time division multiplex under the control of circulating routing memories, which comprise for each time slot the address information of the crosspoint elements which must be switched for a given connection.

(2) Description of the Prior Art

Switching systems of the type described in (1) are generally known. The switching network may consist of one single switching stage comprising a matrix of crosspoint elements or of several switching stages arranged in cascade. These latter switching networks will be used when the number of connected multiplex lines is very large in order to reduce the number of crosspoints. In the case that the number of multiplex lines is not too great, preference will be given to one single matrix of crosspoints also, because in such a case, the control is relatively simpler.

In one matrix of crosspoints which are switched in time division multiplex, the number of connections at each instant may be equally large as the number of connected multiplex lines. For a matrix of $n \times n$ $n$ connections may exist at any instant and if $n$ is relatively large then a relatively strong crosstalk will be produced at each connection via parasitic couplings in the switching matrix.

SUMMARY OF THE INVENTION

It is an object of the invention to reduce the crosstalk so that the switching system may be used both for analog and digital signals, whilst maintaining the properties of a single switching matrix, such as the full accessibility of each output for each input and the absence of blocking.

The switching system according to the invention is therefore characterized in that each incoming time division multiplex line is connected to a switch of a first switching stage which switch is provided with one input for the incoming time division multiplex line and with a plurality of outputs and in that switches are provided in a second switching stage which are equal in number to the plurality of outputs of a switch of the first switching stage, each being provided with a plurality of outputs for connecting outgoing time division multiplex lines and of a plurality of inputs equal to the plurality of incoming time division multiplex lines, in which each switch of the first switching stage is connected via intermediate time division multiplex lines, which are connected to the outputs, to an input of each of the switches of the second switching stage and that furthermore means are available for connecting the time division multiplex intermediate lines which are not used at any moment for a connection, to a point of reference potential.

In a preferred embodiment which results in a minimum number of crosspoints the plurality of switches of the second switching stage is chosen to be equal to the square root of the plurality of incoming time division multiplex lines. Then the plurality of crosspoints for $m$ multiplex lines amounts to : $m^2 + m \sqrt{m}$.

In each switch of the second switching stage the number of connections is at any moment not more than $\sqrt{m}$ and the intermediate lines which are not used and which are connected to the inputs are grounded so that they cannot contribute to the crosstalk. In this manner the crosstalk in dB is halved in an effective manner.

The control of the crosspoints can be arranged in such a way that not more or bigger routing memories are necessary as in the case of one single switching matrix having the same number of inputs and outputs.

SHORT DESCRIPTION OF THE FIGURES

DESCRIPTION OF THE EMBODIMENTS

The switching system to which the invention relates is a time division multiplex system in which subscribers are connected to concentraters by means of subscribers' lines. By means of time division multiplex lines the concentrators are connected to a switching network in an exchange the crosspoints of which can be switched in time division multiplex for forming connections between the time channels of the connected time division multiplex lines.

The channel information is transmitted through the time division multiplex lines in time slots. A frame may, for example, comprise 24 or 32 time slots with a repetition frequency of, for example, 8000 Hz. The number of subscribers whch can be connected to a concentrator may exceed the number of time slots available in a frame by allocating a time slot only to the subscribers which make a call. The treatment of calls and processing the dialling information is outside the scope of the present patent application which is directed to the manner in which the switching network is built up in order to reduce the so-called cross talk therein.

If in a time division multiplex switching network a great number of connections exist at a given moment, that is to say in the same time slot but in different places in the switching network, then a relatively strong cross talk effect will occur in the switching network via parasitic couplings.

Figure 1:
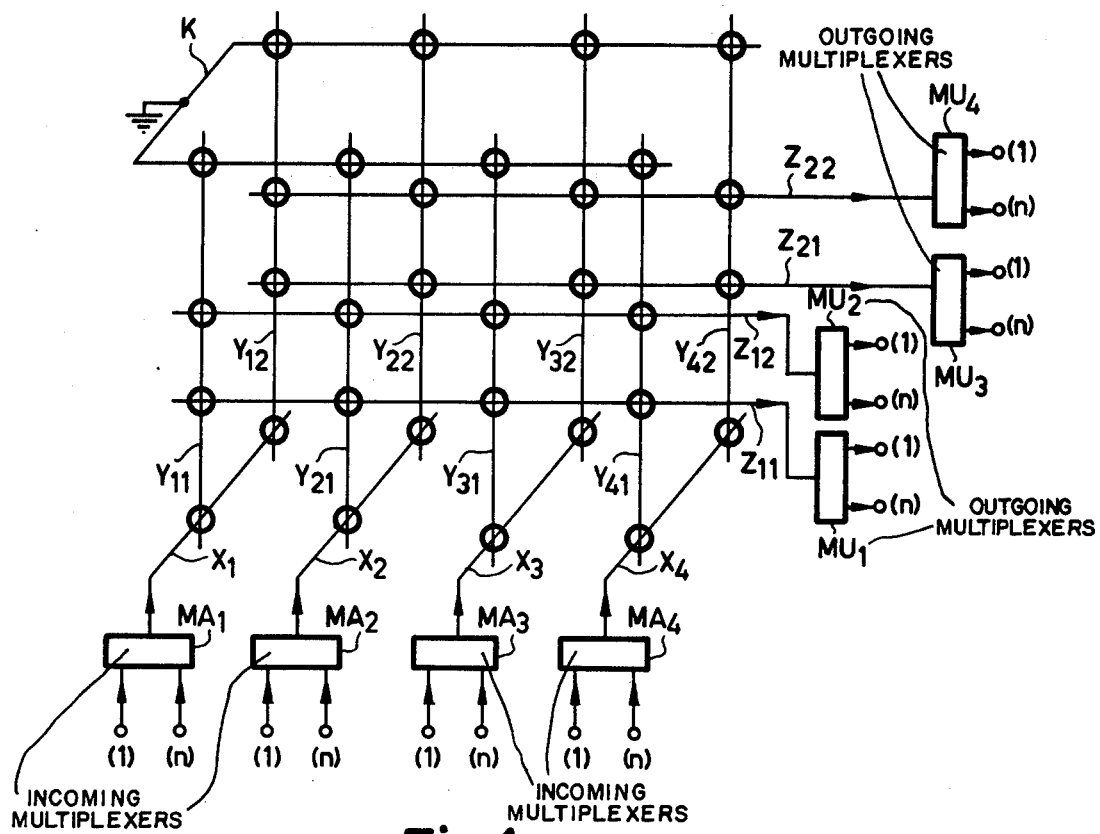
FIG. 1 is a three-dimensional diagram of a switching system according to the invention.

In order to reduce the cross talk the switching network is constructed in the manner shown in FIG. 1.

In FIG. 1 reference $MA_1$ to $MA_4$ indicate incoming multiplexers and $MU_1$ to $MU_4$ indicate outgoing multiplexers. A pair of multiplexers such as $MA_1$ and $MU_1$ belong to one and the same concentrator to which, for example, $n$ subscribers (1) to ($n$) are connected. The function of the incoming multiplexers is to sample the incoming signals and to transmit the sampled signal values in time slots over the incoming time division multiplex lines X1 to X4. The outgoing multiplexers have the reverse function as regards the outgoing time division multiplex lines Z11 to Z22.

By means of a subscriber's line a subscriber is connected to a signal input of an incoming multiplexer and to a corresponding signal output of the outgoing multiplexer of the same concentrator.

The incoming time division multiplex lines X1 to X4 each have access to a group of time division multiplex intermediate lines $Y_{11}$ and $Y_{12}$, $Y_{21}$ and $Y_{22}$, $Y_{31}$ and $Y_{32}$, $Y_{41}$ and $Y_{42}$ respectively. These time division multiplex intermediate lines each have access to the group of outgoing time division multiplex lines $Z_{11}$ and $Z_{12}$, $Z_{21}$ and $Z_{22}$ respectively in such a way that each incoming time division multiplex line can be connected to each outgoing time multiplex line. The connections occur via crosspoint elements which are represented in the Figure by small circles which can be switched in time multiplex.

Reference K in FIG. 1 indicates a central conductor which is grounded. Between each time division multiplex intermediate line Y and the central conductor K a crosspoint element has been applied which connects the relevant time division multiplex intermediate line Y to ground in the time slots at which the intermediate line is not used for a connection. So at any moment $p - 1$ time division multiplex intermediate lines of a group are connected to ground where $p$ represents the number of intermediate lines of a group.

The crosspoints between the time division multiplex intermediate lines $Y_{11}$, $Y_{21}$, $Y_{31}$, $Y_{41}$ and the outgoing time division multiplex lines $Z_{11}$ and $Z_{12}$ constitute a first submatrix and the crosspoints between the time division multiplex intermediate lines $Y_{12}$, $Y_{22}$, $Y_{32}$, $Y_{42}$ and the outgoing time division multiplex lines $Z_{21}$ and $Z_{22}$ constitute a second submatrix. This is shown even more clearly in FIG. 2 in which the switching network is represented in two dimensions. In general there are $p$ submatrices.

Figure 2:
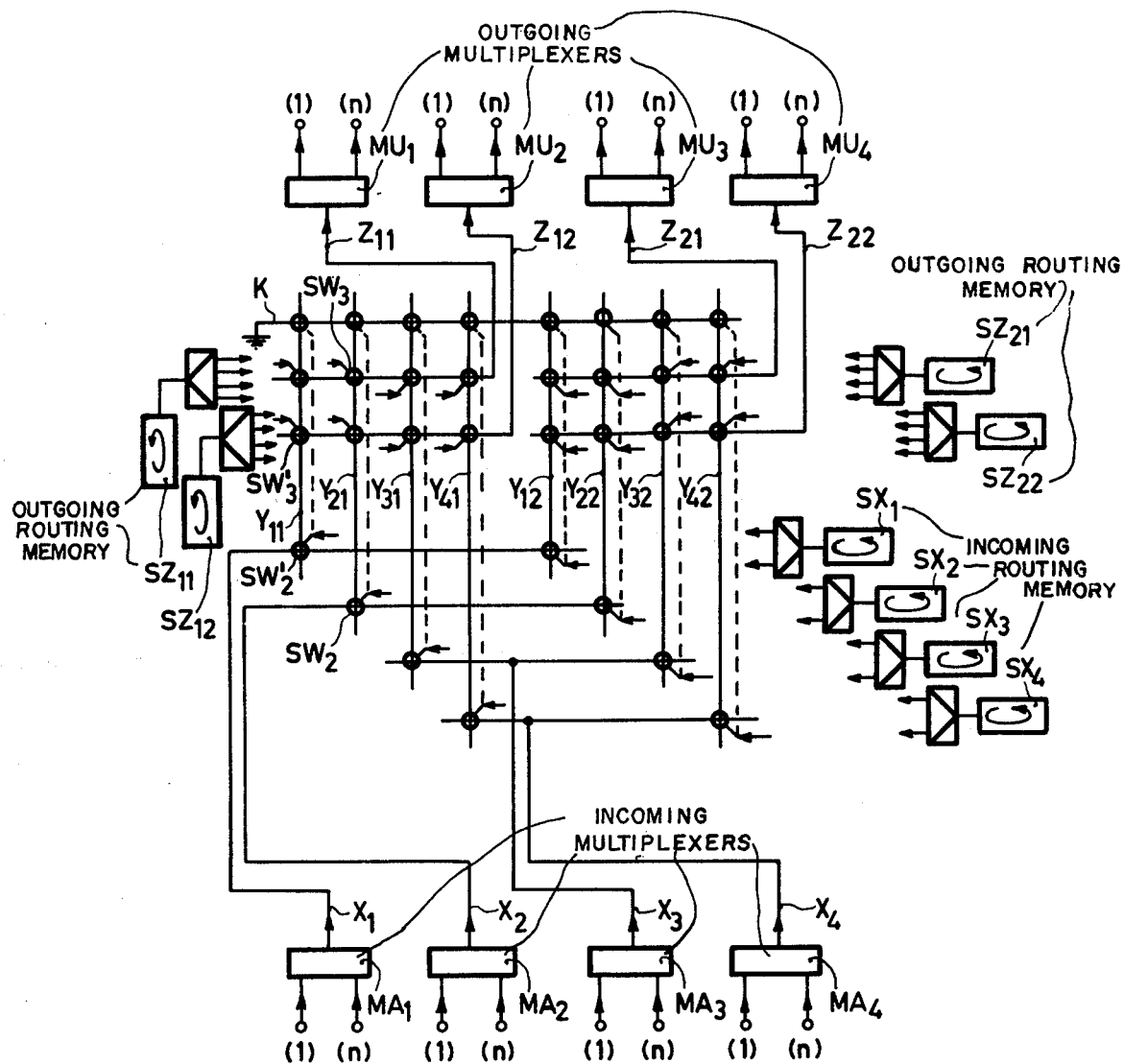
FIG. 2 is a diagram of a switching system according to the invention.

FIG. 2 also shows the control of the crosspoints which are situated between the time division multiplex intermediate lines Y and the central conductor K. Each of these crosspoints is controlled together with the crosspoint between the relevant time division multiplex intermediate line and the incoming time division multiplex line but in the opposite sense in such a way that when the crosspoint element between the incoming time division multiplex line and the time division multiplex intermediate line is closed, the crosspoint element between the time division multiplex intermediate line and the central conductor K is opened and vice versa. The common control of these two coupling points is illustrated in FIG. 2 by a dashed connecting line between the control inputs of the crosspoint elements.

The crosspoints between the incoming time division multiplex lines X and the time division multiplex intermediate lines Y are controlled by the circulating routing memories $SX_1$ to $SX_4$. The crosspoints between the time division multiplex intermediate lines Y and the outgoing time division multiplex lines Z are controlled by the circulating routing memories $SZ_{11}$ to $SZ_{22}$. These memories comprise each a number of memory locations whose number is equal to the number of time slots in a frame. In each of these memory locations the address of a crosspoint can be stored which address can control the crosspoint after having been decoded in a decoder.

To effect a connection it is only necessary to store the addresses of the crosspoints used therewith in the relevant routing memories, in the memory location which corresponds with the desired time slot.

The switching network shown in FIG. 1 and FIG. 2 is from the traffic-technical point of view a matrix in the sense that every incoming time division multiplex line can be connected to every outgoing time division multiplex line without blocking. The required number of crosspoints of the switching network can be determined as follows. If there are $m$ incoming and $m$ outgoing time division multiplex lines then the first stage comprises $m$ switches, each having $p$ crosspoints and the second stage comprises $p$ switches each having $m$ inputs and $m/p$ outputs. The number of crosspoints then amounts to $m \cdot p + p \cdot m \cdot m/p = m \cdot p + m^2$.

The magnitude of the crosstalk in the switches of the second stage is the factor $p$ smaller than the crosstalk in a switch having $m$ inputs and $m$ outputs as only $m/p$ connections can exist simultaneously in each of the switches of the second stage. From this point of view it is favourable to choose a high value for $p$. This, however, will increase the number of crosspoints. A favourable compromise between the requirements for a low cross-talk and a low number of crosspoints is achieved by chosing $p \approx \sqrt{m}$. The number of crosspoints then becomes $m \cdot \sqrt{m} + m^2$ whilst the crosstalk is reduced by a factor $\sqrt{m}$ with respect to a matrix of $m \times m$. This latter means halving the crosstalk in dB's.

Figure 3:
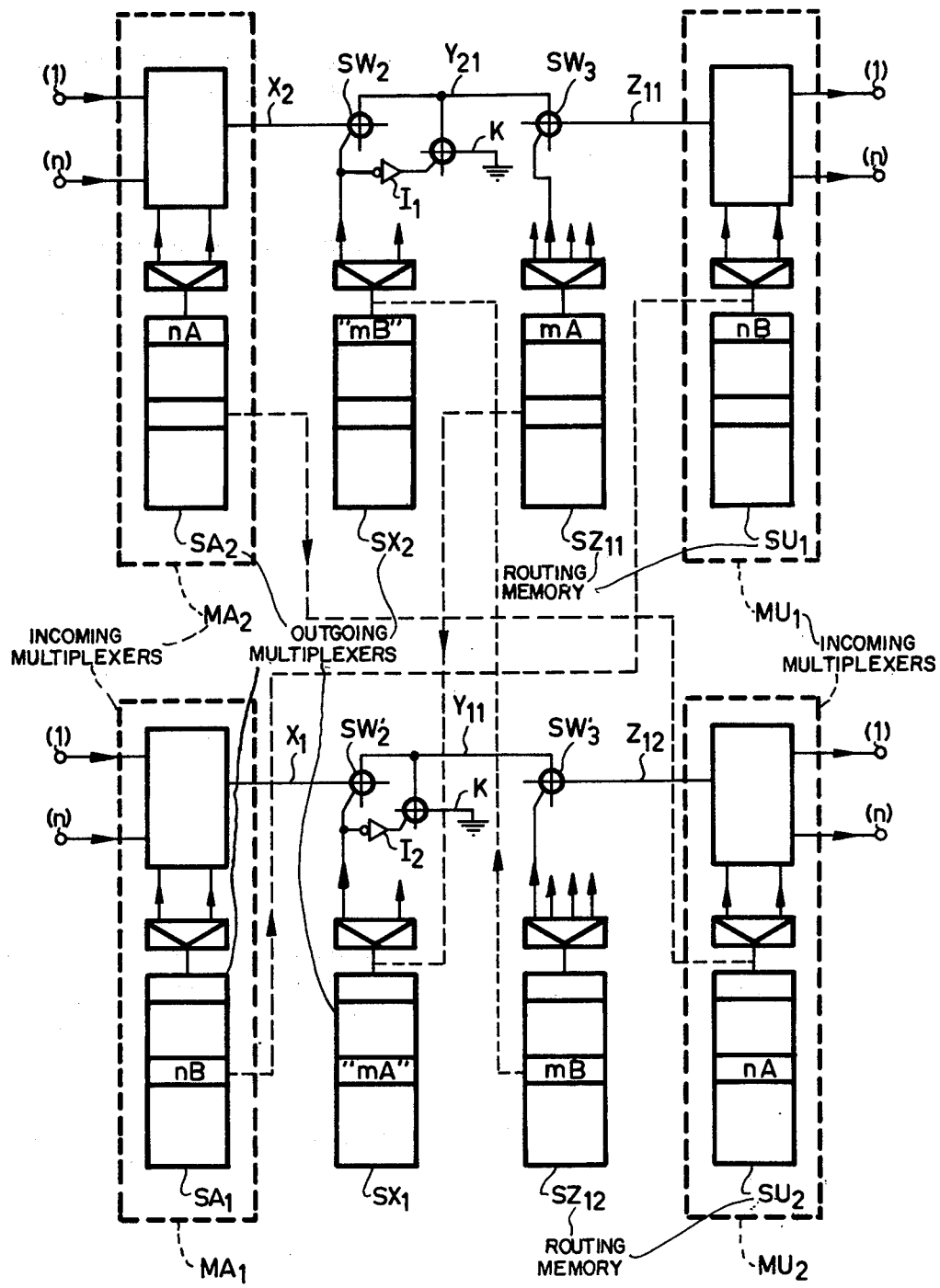
FIG. 3 is a diagram of a bi-directional transmission path and the relevant routing memories.

In FIG. 3 a bi-directional connection path is illustrated. The connecting path forms a connection between a subscriber with the address nA of the concentrator MA2/MU2 and a subscriber having the address nB of concentrator MA1/MU1. The relevant crosspoints for the signal direction A-to-B are the crosspoints indicated in FIG. 2 by $SW_2$ and $SW_3$. For the signal direction B-to-A, $SW_2'$ and $SW_3'$ are the relevant crosspoints. The relevant routing memories are $SX_2$ and $SZ_{11}$, $SX_1$ and $SZ_{12}$ respectively.

The address of crosspoint $SW_3$ is indicated by $mA$, that is to say the address of the group to which subscriber nA belongs. The address of crosspoint $SW_3'$ is likewise indicated by $mB$.

The address of crosspoint $SW_2'$ is indicated by "$mA$", as this address can be derived from the address $mA$. Likewise the address of the crosspoint $SW_2$ is indicated by "$mB$".

If there are, for example $m = 64$ incoming time division multiplex lines then the addresses thereof can be coded by 6 bits. The address of an outgoing time division multiplex line is the same as that of the associated incoming time division multiplex line. The outgoing time division multiplex lines have been divided into $p$ groups. If it now applied that: $p = \sqrt{m} = 8$, then coding can be done in such a way that the three most significant bits indicate the group to which the outgoing time division multiplex line belongs. As the crosspoint $SW_2'$ gives access to the group of outgoing time division multiplex lines which give access to the group to which subscriber nA belongs, the address of $SW_2'$ can be derived from the most significant bits of $mA$. In a corresponding manner the address of $SW_2$ can be derived from the most significant bits of $mB$.

Let us assume that the time slot for the signal direction A-to-B is $t_x$. The time slot for the signal direction B-to-A is displaced over half a frame length relative to $t_x$ and is indicated by $t_{x+a}$, where $x+a = x+a$ modulo $k$ when $k$ is the number of time slots of a frame.

FIG. 3 also shows the circulating routing memories $SA_1$, $SA_2$, $SU_1$, $SU_2$ of the relevant incoming and outgoing multiplexers. These multiplexers control the connection of the subscribers' lines to the time division multiplex lines in the desired time slots. In the FIG. 3 the positions of the addresses $nA$, $nB$, $mA$, $mB$, "$mA$", "$mB$" in the routing memories in time slot $t_x$ are indicated. In this time slot the addresses $nA$, "$mB$", $mA$, $nB$ control the crosspoints for the signal direction A-to-B. Half a frame later the addresses $nB$, "$mA$", $mB$, $nA$ control the crosspoints for the signal direction B-to-A.

By providing the routing memory $SA_2$ with a centre tap and by connecting the latter to the decoder of the routing memory $SU_2$ the latter memory can be dispensed with. The same may be done for the routing memories $SA_1$ and $SU_1$. Then only one routing memory is required for each concentrator.

The routing memory $SZ_{11}$ which contains the address $mA$ may be used to deliver the address "$mA$" of crosspoint $SW_2'$. This can be realized by providing the routing memory $SZ_{11}$ with a centre tap and by connecting the latter to the decoder of routing memory $SX_1$. The latter memory can then be dispensed with. The same can be applied to the routing memories $SZ_{12}$ and $SX_2$ and to the routing memories $SZ_{21}$ and $SX_3$ and the routing memories $SZ_{22}$ and $SX_4$ not shown in FIG. 3. For controlling the switching network then only $m$ routing memories are required instead of the $2m$ memories which are illustrated in FIG. 2 and FIG. 3 for $m = 4$.

When the concentrators to which the subscribers are connected are at some distance from the switching network then, when determining the switching instants in the concentrators the transmission delay between the concentrator and the switching network must be taken into account.

Figure 4A:
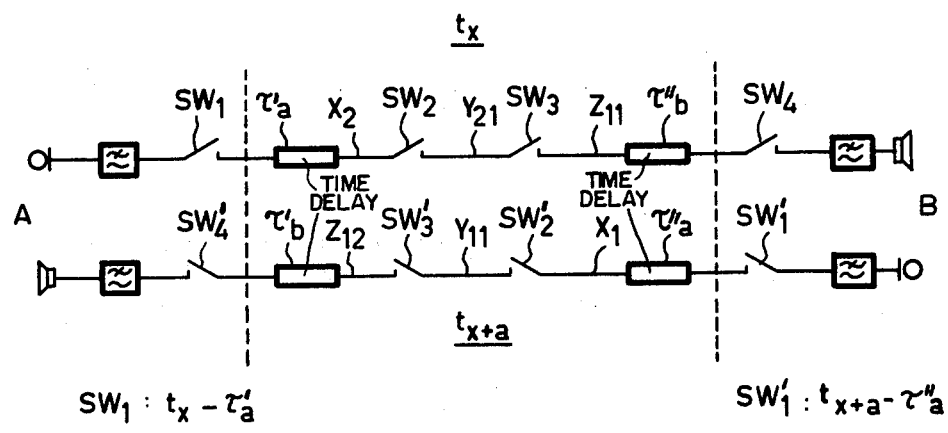
FIG. 4A is a diagram of a bi-directional transmission path with indication of the time slots.

FIG. 4A shows a connection between an A-subscriber and a B-subscriber. The A-concentrator has a transmission delay $\tau'_a$ for the signal direction to the exchange and a delay $\tau'_b$ for the other signal direction. For the B-concentrator they are $\tau''_a$ and $\tau''_b$ respectively.

It is assumed that in the exchange the connection for the signal direction A-to-B is switched in time slot $t_x$ and in the reversed signal direction in time slot $t_{x+a}$.

Figure 4B:
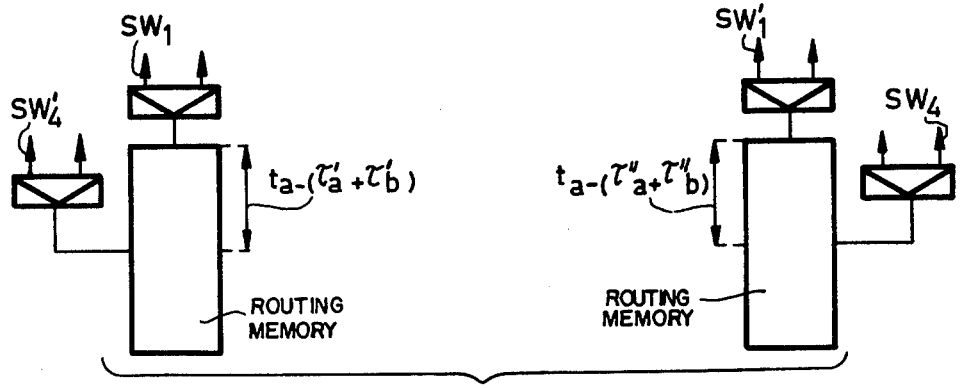
FIG. 4B shows the concentrator routing memories.

Crosspoint $SW_1$ in the A-concentrator must then be switched in time slot $t_x - \tau'_a$ and the crosspoint $SW_4'$ in time slot $t_{x+a} + \tau'_b$. Then the routing memory of the A-concentrator must not be tapped off in the centre but at a distance $\tau'_a + \tau'_b$ above the centre as shown in FIG. 4B. The same applies to concentrator B.

It should be noted that $\tau_a + \tau_b$ are rounded to an integral number of time slots. In practice delays which are smaller than a time slot are compensated by using small buffer memories in the time division multiplex lines.

FIG. 3 shows the crosspoint between the time division multiplex intermediate line $Y_{21}$ and the central conductor K, which crosspoint is controlled via an inverter $I_1$ from the same control point as crosspoint $SW_2$. Also shown is the crosspoint between the time division multiplex intermediate line $Y_{11}$ and the central conductor K which crosspoint is controlled via an inverter $I_2$ from the same control point as coupling point $SW_2'$. This again illustrates that no extra control means are required for controlling the crosspoints associated with the central conductor K, inverters not taken into account.

Every connection through the switching network is made by way of two crosspoints connected in series, such as $SW_2$ and $SW_3$, $SW_2'$ and $SW_3'$ whilst the time division multiplex intermediate line in time slots in which it is not used is connected to ground.

In the switching system described every subscriber can in principle be connected to any other subscriber. However, internal blocking may occur in the exchange. This occurs if time slots are indeed free at the desired incoming and outgoing time division multiplex line but no common free time slot is available. This blocking which occurs in the exchange can be prevented by doubling in the exchange the number of time slots in a frame with respect to the number of time slots of the concentrators which are elligible for a connection.

What is claimed is:

1. A switching network for coupling channels of incoming time division multiplex lines to channels of outgoing time division multiplex lines, said network comprising a first switching stage including switches, each switch having one input for each incoming line and a plurality of outputs; a plurality of intermediate time division multiplex lines coupled to said outputs respectively; a second switching stage including switches equal in number to said plurality of outputs of a first stage switch, each switch having a plurality of inputs coupled to said intermediate lines respectively and a plurality of outputs for coupling to said outgoing lines respectively; each of said switches including a plurality of crosspoint elements; circulating routing memory means including address information for each element for time multiplex controlling each of said elements to achieve a given connection in a respective time slot of a multiplex frame; and means for coupling all of said intermediate lines for at least one half of the duration of said time slots in which said intermediate lines are not used to a reference potential.

2. A switching network as claimed in claim 1, further comprising a central conductor carrying said reference potential, and wherein said coupling means comprises crosspoint elements disposed between the time division multiplex intermediate lines and said central conductor, a plurality of control lines extending between said memory means and said elements disposed between said incoming and intermediate lines respectively, each of said coupling means crosspoint elements being controlled from the same control line as controls the corresponding crosspoint element disposed between the same time division multiplex intermediate line and the incoming time division multiplex line but with a polarity opposite with respect to that which controls said corresponding crosspoint element.

3. A switching network as claimed in claim 1, said memory means comprising a circulating routing memory for each outgoing time division multiplex line for applying the address of a crosspoint to the switch of the second switching stage and to the switch of the first switching stage which corresponds to the same subscriber connection with a mutual delay of half a multiplex cycle.

4. A switching network as claimed in claim 1 wherein the number of second stage switches is approximately equal to the square root of the number of incoming lines.

* * * * *